US012175638B1

(12) United States Patent
Cooper et al.

(10) Patent No.: US 12,175,638 B1
(45) Date of Patent: Dec. 24, 2024

(54) SYSTEM AND METHODS FOR LOW-LIGHT IMAGE ENHANCEMENT UTILIZING DENOISING PREPROCESSING WITH WAVELET DECOMPOSITION

(71) Applicant: AtomBeam Technologies Inc., Moraga, CA (US)

(72) Inventors: Joshua Cooper, Columbia, SC (US); Aliasghar Riahi, Orinda, CA (US); Charles Yeomans, Orinda, CA (US); Zhu Li, Overland Park, KS (US)

(73) Assignee: ATOMBEAM TECHNOLOGIES INC, Moraga, CA (US)

( * ) Notice: Subject to any disclaimer, the term of this patent is extended or adjusted under 35 U.S.C. 154(b) by 0 days.

(21) Appl. No.: 18/624,038

(22) Filed: Apr. 1, 2024

(51) Int. Cl.
*G06T 5/70* (2024.01)
*G06N 3/045* (2023.01)
*G06T 5/10* (2006.01)

(52) U.S. Cl.
CPC .............. *G06T 5/70* (2024.01); *G06N 3/045* (2023.01); *G06T 5/10* (2013.01); *G06T 2207/20064* (2013.01)

(58) Field of Classification Search
CPC ... G06T 5/70; G06T 5/10; G06T 2207/20064; G06T 2207/20084; G06T 2207/20081; G06T 5/60; G06T 5/50; G06T 2207/10024; G06T 2207/20221; G06T 2207/20224; G06T 3/4015; G06T 3/4046; G06T 11/00; G06T 11/008; G06N 3/045; G06N 3/08; G06N 3/084; G06N 3/048; G06N 3/04; G06N 3/047; G06N 3/088
See application file for complete search history.

(56) References Cited

U.S. PATENT DOCUMENTS

| | | | | |
|---|---|---|---|---|
| 10,290,107 B1 * | 5/2019 | Casas | .................. | G06T 7/11 |
| 11,508,037 B2 * | 11/2022 | Yang | .................. | G06T 5/30 |
| 11,842,460 B1 * | 12/2023 | Chen | .................. | G06T 5/60 |
| 2009/0324117 A1 * | 12/2009 | Demandolx | ............. | G06T 5/10 |
| | | | | 382/254 |

(Continued)

OTHER PUBLICATIONS

"Wavelet Approximation—Aware Residual Network for Single Image Deraining"; Wei-Yen Hsu, IEEE Transactions on Pattern Analysis and Machine Intelligence (vol. 45, Issue: 12, 2023, pp. 15979-15995) (Year: 2023).*

(Continued)

*Primary Examiner* — Michael S Osinski
(74) *Attorney, Agent, or Firm* — Galvin Patent Law LLC; Brian R. Galvin

(57) ABSTRACT

A system and method are disclosed for low-light image enhancement using denoising preprocessing with wavelet decomposition AI-based techniques to enhance image quality of low-light images. Subsampled images are created from a raw input image. A wavelet decomposition process is performed on each subimage to create multiple frequency domain subimages. Each frequency domain subimage is input into a corresponding neural network. The output of each corresponding network is input to an inverse wavelet module. The output of the inverse wavelet module is a denoised image that is input to an image signal processing pipeline, where additional processing may be performed on the denoised image.

20 Claims, 8 Drawing Sheets

(56) References Cited

U.S. PATENT DOCUMENTS

| | | | | |
|---|---|---|---|---|
| 2013/0022288 | A1* | 1/2013 | Sartor | G06T 5/10 |
| | | | | 382/266 |
| 2016/0253787 | A1* | 9/2016 | Chen | G06T 5/70 |
| | | | | 382/275 |
| 2019/0096038 | A1* | 3/2019 | El-Khamy | G06T 5/70 |
| 2019/0108618 | A1* | 4/2019 | Hwang | G06T 3/4046 |
| 2020/0092453 | A1* | 3/2020 | Gordon | H04N 23/75 |
| 2020/0234414 | A1* | 7/2020 | Zamir | G06N 3/08 |
| 2020/0349411 | A1* | 11/2020 | Luo | G06N 3/084 |
| 2021/0158485 | A1* | 5/2021 | Wang | G06T 7/70 |
| 2021/0241429 | A1* | 8/2021 | Pan | H04N 25/135 |
| 2022/0122308 | A1* | 4/2022 | Kalarot | G06T 11/60 |
| 2022/0138992 | A1* | 5/2022 | Wu | G06N 3/045 |
| | | | | 382/232 |
| 2022/0247889 | A1* | 8/2022 | Babiloni | G06T 3/4015 |
| 2022/0414954 | A1* | 12/2022 | Ye | G06T 5/60 |
| 2023/0014745 | A1* | 1/2023 | Chen | G06N 3/08 |
| 2023/0058096 | A1* | 2/2023 | Ferrés | G06T 7/40 |
| 2023/0109090 | A1* | 4/2023 | Maharjan | G06T 7/11 |
| | | | | 382/254 |
| 2023/0342886 | A1* | 10/2023 | Meyer | G06T 5/70 |
| 2024/0135496 | A1* | 4/2024 | Dudhane | G06T 5/50 |
| 2024/0161251 | A1* | 5/2024 | Li | G06T 5/10 |
| 2024/0202872 | A1* | 6/2024 | Pati | G06T 7/10 |

OTHER PUBLICATIONS

"A Sub-band Approach to Deep Denoising Wavelet Networks and a Frequency-adaptive Loss for Perceptual Quality"; Caglar Aytekin, 2021 IEEE 23rd International Workshop on Multimedia Signal Processing (MMSP) (2021, pp. 1-6) (Year: 2021).*

* cited by examiner

SYSTEM AND METHODS FOR LOW-LIGHT IMAGE ENHANCEMENT UTILIZING DENOISING PREPROCESSING WITH WAVELET DECOMPOSITION

CROSS-REFERENCE TO RELATED APPLICATIONS

None.

BACKGROUND OF THE INVENTION

Field of the Art

The present invention is in the field of image processing, and more particularly is directed to the problem of low-light image enhancement.

Discussion of the State of the Art

Low-light digital images, such as those captured in challenging lighting conditions, can suffer from several disadvantages compared to images captured in well-lit conditions. One issue that is faced with low-light images is that of noise. Low-light images often have higher levels of noise, which can manifest as graininess or speckles in the image. This is due to the amplification of the sensor signal to compensate for the low light, which also amplifies the sensor's inherent noise. Another prevalent problem is loss of detail. In low-light conditions, the camera may struggle to capture fine details, leading to a loss of sharpness and clarity in the image. This can be exacerbated by some noise reduction algorithms, which may blur the image to reduce noise. Another issue that may occur is color distortion. Colors in low-light images can appear distorted or inaccurate due to the limited amount of light available for the sensor to capture. This can result in a lack of vibrancy and fidelity in the colors of the image. Moreover, low-light images can suffer from reduced dynamic range, meaning that there is less contrast between the darkest and lightest parts of the image. This can result in loss of detail in shadowed areas and highlights. Additionally, in low-light conditions, the camera may use longer exposure times to capture enough light, which can result in motion blur if there is any movement in the scene or if the camera is not held steady.

Moreover, due to the challenges of capturing images in low-light conditions, low-light images may exhibit more digital artifacts, such as color noise, banding, posterization, or compression artifacts, especially when the image is processed or compressed. Color noise refers to random variations in color in an image, often seen as splotches or patches of unnatural colors. It can be more pronounced in low-light images due to the limited amount of light available for the sensor to capture. Banding may appear as visible bands of different shades or colors in an image, usually due to limitations in bit depth or compression. In low-light images, banding can be more noticeable, especially in areas of smooth gradient transitions. Posterization can occur when there are abrupt changes in color or tone in an image, resulting in a loss of smooth transitions. In low-light images, posterization can be more pronounced, particularly in areas with gradual changes in brightness or color. The aforementioned artifacts can impact the overall quality and appearance of low-light images. Overall, capturing high-quality images in low-light conditions can be challenging due to these disadvantages.

SUMMARY OF THE INVENTION

Accordingly, there is disclosed herein, systems and methods for low-light image enhancement utilizing denoising preprocessing with wavelet decomposition. In a digital camera, under low-light conditions, the image sensor can suffer from a low signal-to-noise ratio. The result can be noisy images, as not enough photons are reaching the image sensor under the low-light conditions. Digital cameras may employ countermeasures for low-light, each with corresponding shortcomings. For example, a digital camera may enlarge the aperture of the camera to allow additional light to reach the image sensor, but enlarging the aperture can reduce the depth of field, causing at least part of the image to appear out of focus. An additional countermeasure can include increasing the exposure time. While this technique enables additional light to reach the sensor, it also increases the probability of undesired motion blur. Another option is increasing the ISO. ISO in digital photography refers to the sensitivity of the camera's sensor to light. ISO is an acronym for the International Organization for Standardization, which sets the standards for camera sensitivity ratings. In the context of photography, ISO is used to describe the sensor's sensitivity to light. A lower ISO number (e.g., ISO 100) indicates low sensitivity to light, meaning that more light is needed to properly expose the image. A lower ISO number is typically used in bright conditions to avoid overexposure and to maintain image quality. A higher ISO number (e.g., ISO 1600 or higher) indicates higher sensitivity to light, meaning that less light is needed to properly expose the image. This is useful in low-light conditions where there is not enough ambient light to properly expose the image. However, increasing the ISO also increases the amount of digital noise in the image, which can reduce image quality and create undesirable effects.

Disclosed embodiments address the aforementioned problems and shortcomings by performing denoising on the low-light image in the Bayer domain prior to inputting the image information into the ISP (Image Signal Processing) pipeline. Embodiments utilize wavelet decomposition to divide and conquer the problem by processing sensor field subimages utilizing separate corresponding neural networks. The wavelet decomposition can include decomposing the input raw image into multiple low and high frequency subimages. Denoising the image in this way prior to inputting the image data into the ISP can improve the efficacy of downstream processing in the ISP, thereby creating improved low-light images.

According to a preferred embodiment, there is provided a system for image enhancement, comprising: a computing device comprising at least a memory and a processor; a denoising preprocessing module comprising a first plurality of programming instructions stored in the memory and operable on the processor, wherein the first plurality of programming instructions, when operating on the processor, cause the computing device to: create a plurality of subsampled subimages from a raw input image; perform a wavelet decomposition process on each subimage from the plurality of subimages to generate a plurality of frequency domain subimages; input each frequency domain subimage from the plurality of frequency domain subimages into a corresponding neural network; provide an output of each corresponding neural network to an inverse wavelet module; and provide an output of the inverse wavelet module to an image signal processing pipeline.

According to another preferred embodiment, there is provided a method for image enhancement, comprising steps of: creating a plurality of subsampled subimages from a raw input image; performing a wavelet decomposition process on each subimage from the plurality of subimages to generate a plurality of frequency domain subimages; inputting each frequency domain subimage from the plurality of frequency domain subimages into a corresponding neural network; providing an output of each corresponding neural network to an inverse wavelet module; and providing an output of the inverse wavelet module to an image signal processing pipeline.

According to another preferred embodiment, there is provided a computer program product for an electronic computation device comprising a computer readable storage medium having program instructions embodied therewith, the program instructions executable by a processor to cause the electronic computation device to: create a plurality of subsampled subimages from a raw input image; perform a wavelet decomposition process on each subimage from the plurality of subimages to generate a plurality of frequency domain subimages; input each frequency domain subimage from the plurality of frequency domain subimages into a corresponding neural network; provide an output of each corresponding neural network to an inverse wavelet module; and provide an output of the inverse wavelet module to an image signal processing pipeline.

According to an aspect of an embodiment, the denoising preprocessing module further comprises programming instructions stored in the memory and operable on the processor to create the plurality of subsampled subimages from a Bayer raw input image.

According to an aspect of an embodiment, the denoising preprocessing module further comprises programming instructions stored in the memory and operable on the processor to utilize a Haar wavelet as a decomposition filter in the wavelet decomposition process.

According to an aspect of an embodiment, the denoising preprocessing module further comprises programming instructions stored in the memory and operable on the processor to create four frequency domain subimages for the plurality of frequency domain subimages.

According to an aspect of an embodiment, the denoising preprocessing module further comprises programming instructions stored in the memory and operable on the processor to perform downsampling as part of the wavelet decomposition process.

According to an aspect of an embodiment, the denoising preprocessing module further comprises programming instructions stored in the memory and operable on the processor to perform processing rows of image data, followed by processing columns of image data.

According to an aspect of an embodiment, there is provided a neural network module comprising a second plurality of programming instructions stored in the memory and operable on the processor to implement the plurality of neural networks, wherein each neural network includes a Leaky ReLU activation function.

According to an aspect of an embodiment, the neural network module further comprises programming instructions stored in the memory and operable on the processor to implement a plurality of neural network blocks, wherein the plurality of neural network blocks includes at least one convolutional block, and least one residual block, and at least one Squeeze-and-Excitation block.

BRIEF DESCRIPTION OF THE DRAWING FIGURES

Figure 1:
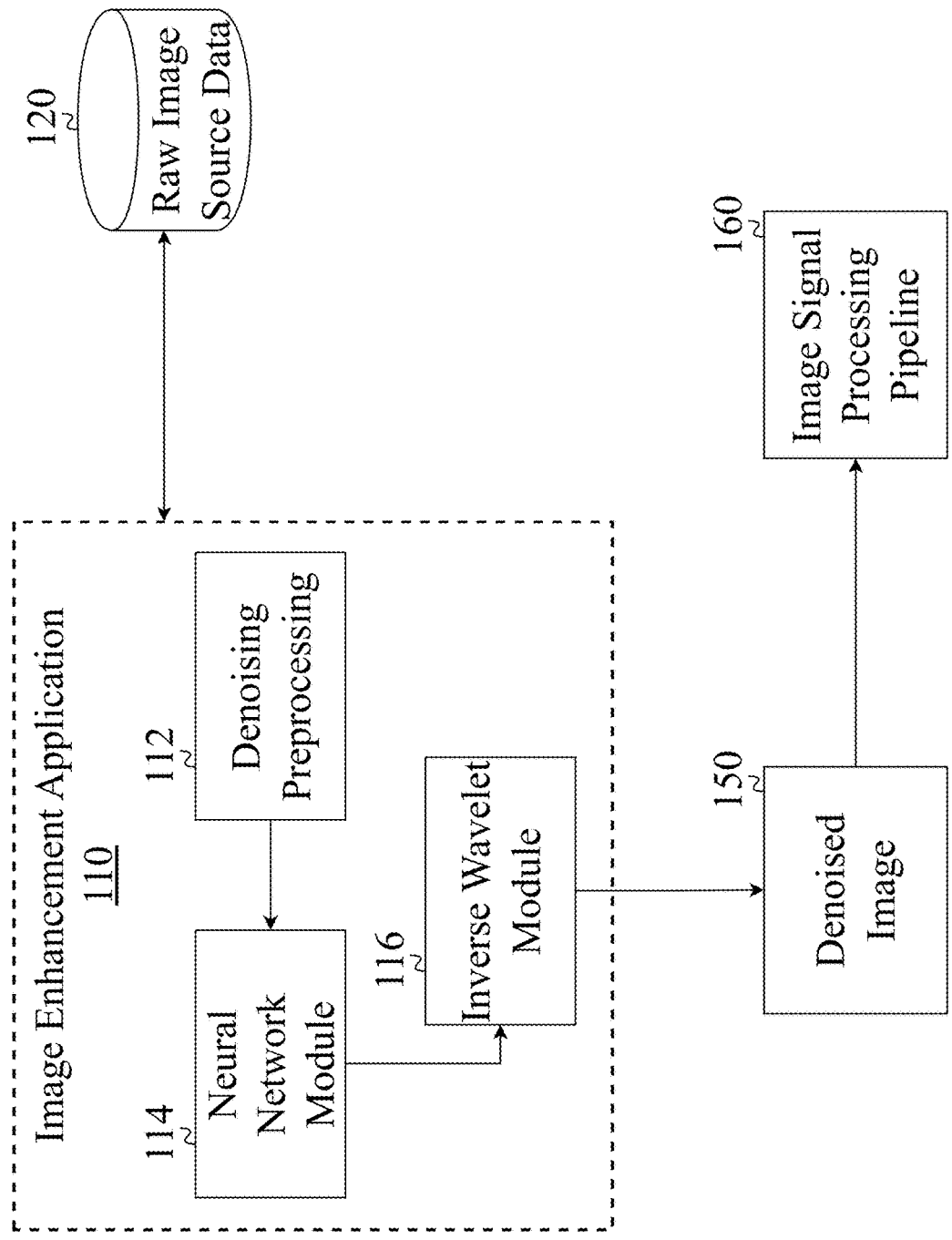
FIG. 1 is a block diagram illustrating components for image enhancement utilizing a denoising preprocessing module, according to an embodiment.

The drawings are not necessarily to scale. The drawings are merely schematic representations, not intended to portray specific parameters of the disclosed embodiments. The drawings are intended to depict only typical embodiments of the invention, and therefore should not be considered as limiting in scope.

DETAILED DESCRIPTION OF THE INVENTION

Low-light digital images can be difficult to enhance. Underexposed images often have a limited dynamic range, meaning there is less contrast between the darkest and lightest areas of the image. This can result in a flat or dull appearance. Image signal processing (ISP) techniques, such as increasing the brightness of an underexposed image during the ISP pipeline can lead to an increase in digital noise, particularly in the darker areas. This can result in a grainy or speckled appearance, reducing image quality. Furthermore, underexposed areas of an image may lack detail and appear as solid black areas, especially in shadowed regions. This can result in a loss of important information and reduce the overall quality of the image Low-light digital images can be difficult to enhance. Underexposed images often have a limited dynamic range, meaning there is less contrast between the darkest and lightest areas of the image. This can result in a flat or dull appearance. Image signal processing (ISP) techniques, such as increasing the brightness of an underexposed image during the ISP pipeline can lead to an increase in digital noise, particularly in the darker areas. This can result in a grainy or speckled appearance, reducing image quality. Furthermore, underexposed areas of an image may lack detail and appear as solid black areas, especially in shadowed regions. This can result in a loss of important information and reduce the overall quality of the image.

Disclosed embodiments address the aforementioned issues with a novel approach that includes denoising the input image prior to input to the ISP pipeline. Images in a Bayer RGBG format are subject to a wavelet decomposition process, resulting in multiple frequency domain subimages, where each frequency domain subimage represents a different frequency range of the original input image. Each frequency domain subimage is input to a corresponding neural network. The neural networks are trained on dark data sets with a corresponding noise-free ground truth image. Once trained, the neural networks can provide wavelet outputs that can then be input to an inverse wavelet process to produce a denoised image that is then input to the ISP pipeline. By denoising the image using one or more neural networks prior to the ISP pipeline, the ISP pipeline can achieve improved results in terms of extracting details from low-light images.

Digital photography plays a significant role in today's society, influencing various aspects of our lives, including communication, entertainment, documentation, and art. Digital photography enables people to visually communicate ideas, emotions, and experiences quickly and easily. Platforms like social media and messaging apps rely heavily on images to convey messages and connect people around the world. Digital photography has revolutionized the way we document events, experiences, and history. It allows the capturing of moments in time and preserve them for future generations. From personal memories to historical events, digital photography plays a crucial role in documenting our lives. Digital photography is a powerful tool for journalism and storytelling, allowing journalists and storytellers to capture and convey powerful narratives through images.

Beyond these important benefits, digital photography also plays a crucial role in security and criminal investigations, providing law enforcement agencies with valuable tools for capturing, analyzing, and documenting evidence. Digital photography is used in surveillance systems to monitor and record activities in public spaces, buildings, and other areas of interest. Surveillance images can be used to identify suspects, track their movements, and gather evidence of criminal activity. Sometimes the images are acquired under lighting conditions that are less than ideal. The image processing techniques provided by disclosed embodiments can enable improved enhancement of low-light images, potentially revealing important evidence to law enforcement authorities.

Digital image acquisition devices, whether they be security cameras, smartphone cameras, body cameras, or cameras for other applications, all share some common components and principles. The image sensor is a key component of a digital camera and is responsible for capturing light and converting it into digital signals. There are two main types of image sensors used in digital cameras: CCD (Charge-Coupled Device) and CMOS (Complementary Metal-Oxide-Semiconductor). The sensor's resolution, size, and sensitivity to light (ISO performance) are important factors in determining image quality. The image sensor receives focused light through a lens. The lens plays an important role in determining the sharpness, clarity, and depth of field of the final image. Different lenses have different focal lengths, apertures, and optical characteristics, allowing photographers to achieve various creative effects. Another important aspect of controlling how much light reaches the image sensor is the shutter. The shutter controls the duration of light exposure to the image sensor. When a digital image is acquired, the shutter opens to allow light to reach the sensor, and then closes to end the exposure. The shutter speed, measured in fractions of a second, determines how long the sensor is exposed to light and affects the motion blur in the image. Yet another aspect affecting how much light reaches the sensor is the aperture setting. The aperture is an adjustable opening in the lens that controls the amount of light passing through to the image sensor. It also affects the depth of field, or the range of distances over which objects appear sharp in the image. Aperture size is measured in f-stops, with smaller f-stop numbers indicating larger apertures and vice versa.

The image sensor converts light into electrical signals, which are then processed to create a digital image. The sensor includes an array of light-sensitive pixels, each capable of converting light into an electrical signal. The image sensor may further include a Bayer filter array, which provides of a pattern of red, green, and blue filters placed over the pixels. Each pixel captures a color channel. After the digital image is captured, it undergoes further processing by an ISP (image signal processing) pipeline to enhance its quality and adjust factors such as brightness, contrast, and color balance. Disclosed embodiments provide preprocessing for the Bayer domain raw input image, and use wavelet decomposition to generate a denoised image that is then provided to the ISP pipeline, enabling improvements in extracting enhanced detail from low-light images.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "pixel" refers to the smallest controllable element of a digital image. It is a single point in a raster image, which is a grid of individual pixels that together form an image. Each pixel has its own color and brightness value, and when combined with other pixels, they create the visual representation of an image on a display device such as a computer monitor or a smartphone screen.

The term "neural network" refers to a computer system modeled after the network of neurons found in a human brain. The neural network is composed of interconnected nodes, called artificial neurons or units, that work together to process complex information.

The term 'signal-to-noise ratio' (SNR) is a measure used in signal processing to quantify the ratio of the strength of a signal to the strength of background noise that affects the signal. A higher SNR indicates that the signal is stronger relative to the noise, which generally means that the signal is clearer and easier to detect or interpret. SNR may be expressed in decibels (dB) and is calculated as the ratio of the power of the signal to the power of the noise Conceptual Architecture FIG. 1 is a block diagram illustrating components for image enhancement utilizing a denoising preprocessing module, according to an embodiment. An image enhancement application 110 exists that comprises at least a denoising preprocessing module 112, neural network module 114, and inverse wavelet module 116. The image enhancement application has connections to receive raw image source data 120, and output data to the image signal processing (ISP) pipeline 160. The raw image source data 120 can include image source data in a Bayer format. A Bayer raw image is a type of image format that may be used in digital cameras and other imaging devices. The Bayer format may include images comprising multiple sets of four pixels. Each set includes a red pixel, a blue pixel, and two green pixels. This arrangement is based on the fact that the human eye is more sensitive to green light than to red or blue. One or more embodiments may utilize other formats as part of raw image source data 120, instead of, or in addition to, data in a Bayer format. The raw image data can include bitmaps, tagged image file format (TIFF), and/or other raw formats such as NEF, ARW, RAF, RW2, and/or ORF formats.

The denoising preprocessing module 112 can include functions and/or instructions for separating an image into low and high frequency components via digital filtering techniques, such as two-dimensional Fast Fourier Transforms (FFT), wavelet decomposition, and/or other suitable techniques. A combination of low-pass filtering, high-pass filtering, bandpass filtering, and/or notch filtering may be used to create multiple frequency domain subimages.

The inverse wavelet module 116 accepts wavelet coefficients from a previous wavelet decomposition and reconstructs an original signal based on the coefficients. In one or more embodiments, a threshold may be used as a criterion for processing the wavelet coefficients in order to remove noise or small details, which can help in denoising the signal or image. The thresholded coefficients can be used to create a denoised version of the original signal or image using an inverse wavelet transform. The denoised image 150 is a denoised version of an image from the raw image source data 120. Reconstructed image 150 is input to image signal processing (ISP) pipeline 160. The ISP can include one or more processors and/or specialized circuits for processing the denoised image 150. The ISP pipeline can include hardware and software for demosaicing, color correction, sharpening, tone mapping, and/or other functions. By denoising the image prior to inputting the image into the ISP pipeline 160, disclosed embodiments can achieve improved enhancement of low-light images.

Figure 2:
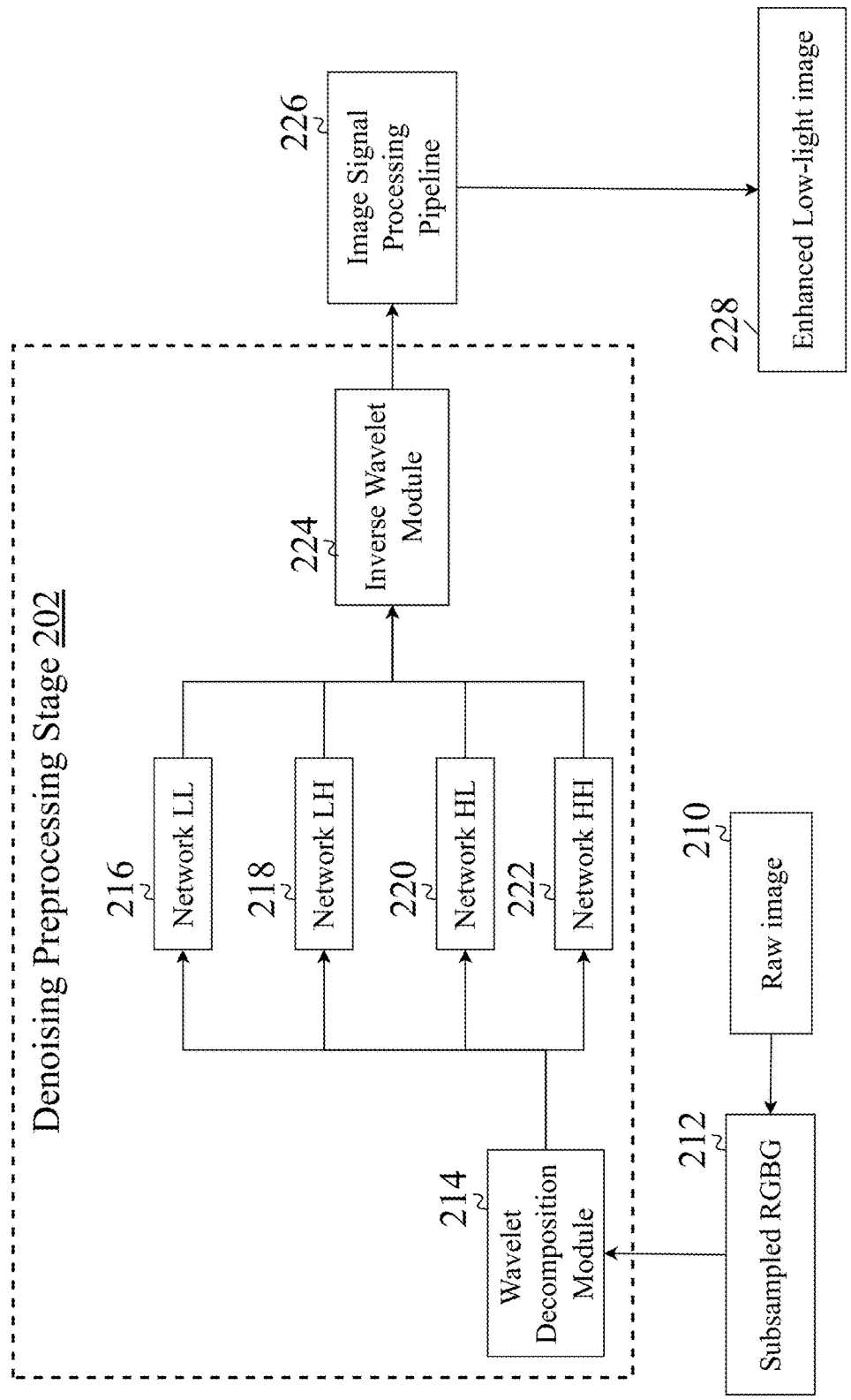
FIG. 2 is a block diagram illustrating an exemplary system architecture for image enhancement, according to an embodiment.

FIG. 2 is a block diagram illustrating an exemplary system architecture for image enhancement, including a denoising preprocessing stage 202, according to an embodiment. A raw image 210 is converted to a subsampled image 212 in a Bayer RGBG format, indicating an arrangement where a set of pixels includes a red pixel, a blue pixel, and two green pixels. The green pixels may be oriented diagonally from each other in one or more embodiments. The subsampled image is input to wavelet decomposition module 214, which creates multiple frequency domain subimages. In one or more embodiments, the wavelet decomposition module 214 utilizes a Haar wavelet as a decomposition filter in the wavelet decomposition process. In one or more embodiments, four subimages are created via high-pass and low-pass filtering. These images can be denoted as LL, LH, HL, and HH. Each image represents a different frequency range. In embodiments, LL represents the lowest frequency range, HH represents the highest frequency range, and LH and HL represent intermediate ranges, where HL represents higher frequencies than the LH range. Each frequency domain subimage can be input to a corresponding neural network. The LL frequency domain subimage can be input to neural network 216, the LH frequency domain subimage can be input to neural network 218, the HL frequency domain subimage can be input to neural network 220, and the HH frequency domain subimage can be input to neural network 222. The processed frequency domain subimages can then be input to inverse wavelet module 224, and the resulting denoised output of the inverse wavelet module 224 is input to an image signal processing (ISP) pipeline 226. The ISP pipeline 226 can then operate on a denoised input image, resulting in an enhanced low-light image 228.

Figure 3:
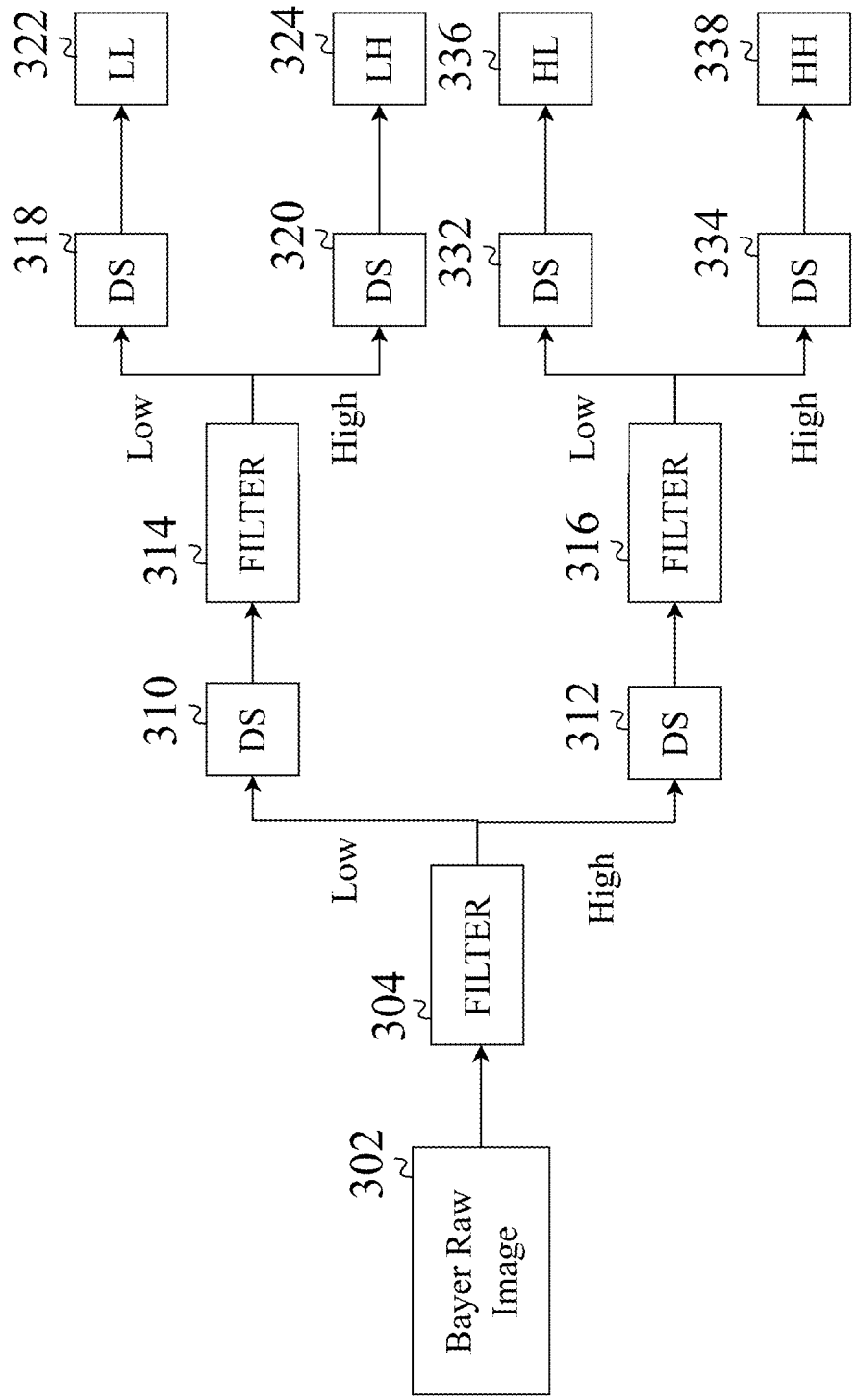
FIG. 3 is a diagram indicating a wavelet transform architecture, according to an embodiment.

FIG. 3 is a diagram indicating a wavelet transform architecture, according to an embodiment. In embodiments, a Bayer raw image 302 is input to a filter 304, that produces a low frequency subimage and a high frequency subimage. In one or more embodiments, creating subsampled subimages from the raw input image comprises inputting a raw image in a Bayer raw image format. The low frequency subimage is input to downsampling module 310, and the high frequency subimage is input to downsampling module 312. In one or more embodiments, the downsampling performed by the downsampling modules can include a process of reducing the resolution of an image or subimage by removing pixels. In embodiments, the downsampling modules downsample by two. In one or more embodiments, the wavelet decomposition process further comprises downsampling. The output of downsampling module 310 is input to filter 314, where the filter 314 produces a low frequency subimage and a high frequency subimage. A similar process occurs with the output of downsampling module 312, which is input to filter 316, where the filter 316 produces a low frequency subimage and a high frequency subimage. These images are again downsampled using respective downsampling modules 318, 320, 332, and 334. The resulting output are the frequency domain subimages, indicated as LL 322, LH 324, HL 336, and HH 338. In some embodiments, the filtering may be along rows of an image, columns of an image, diagonally, and/or other suitable technique. Embodiments can include processing rows of image data, followed by processing columns of image data.

Figure 4:
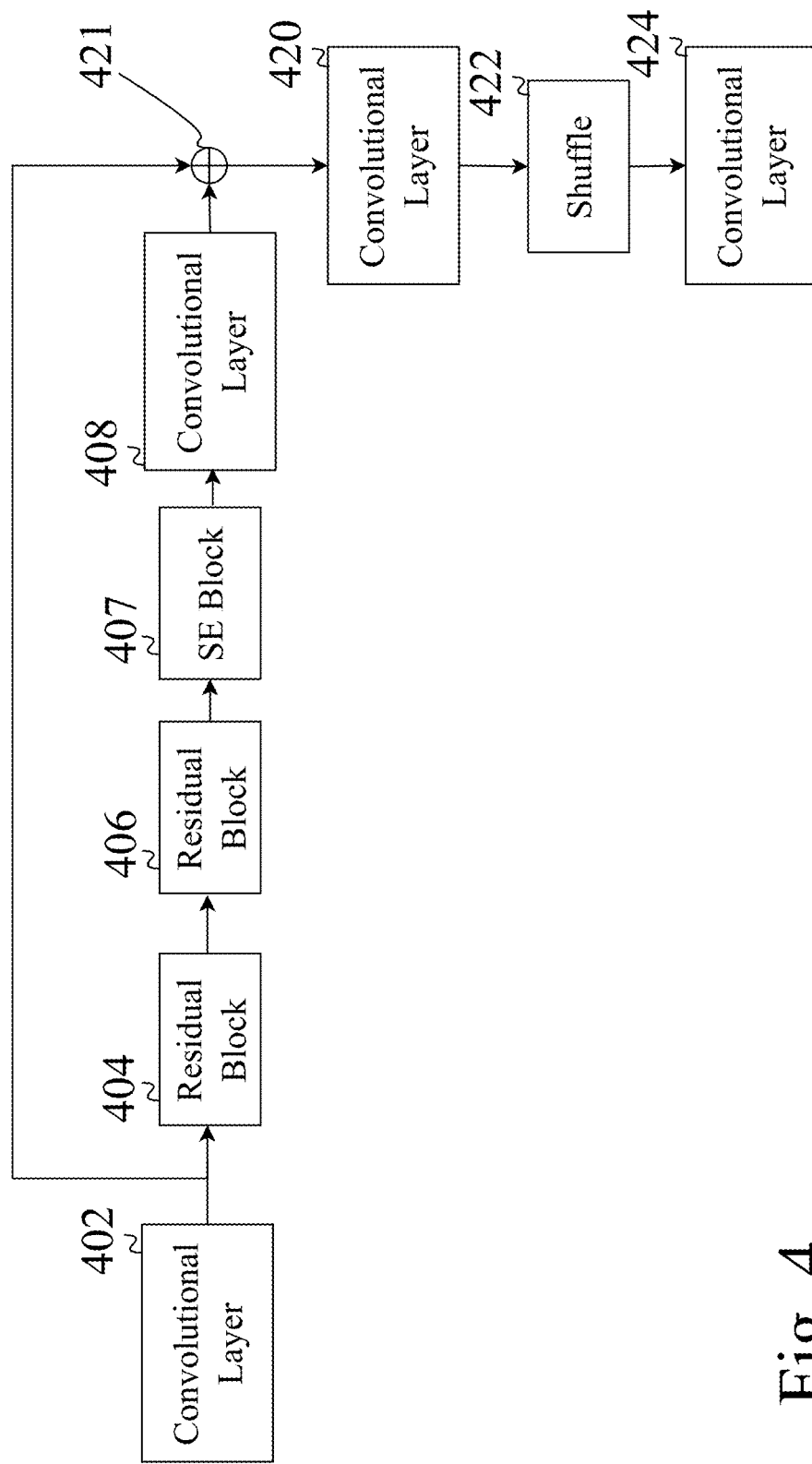
FIG. 4 is a diagram indicating a neural network architecture, according to an embodiment.

FIG. 4 is a diagram indicating a neural network architecture, according to an embodiment. The neural network architecture can include a convolutional layer 402, the output of which feeds into residual block 404, which then feeds into residual block 406. The output of residual block 406 can feed into the output of SE (Squeeze-and-Excitation) block 407. The SE block includes two main operations: squeeze and excitation. The squeeze operation involves reducing the spatial dimensions of the input feature maps to a single global value per channel. In embodiments, the squeeze operation is performed using global average pooling, which computes the average value of each channel across all spatial locations. The result is a 1D tensor with the same number of channels as the input. In the excitation operation, the 1D tensor obtained from the squeeze operation is passed through two fully connected (FC) layers with a non-linear activation function (such as the ReLU) in between. The first FC layer reduces the dimensionality of the tensor, while the second FC layer expands it back to the original number of channels. In embodiments, a sigmoid or softmax activation function is applied at the end to generate a channel-wise attention vector.

In embodiments, the output of the excitation operation is multiplied element-wise with the input feature maps to recalibrate them. This operation scales the feature maps by the importance assigned to each channel by the excitation operation. By incorporating the SE block into disclosed embodiments, the network can learn to selectively emphasize informative features and suppress irrelevant ones for the purposes of denoising an image, leading to improved accuracy and efficiency in enhancement of low-light images.

The output of the SE block 407 is input to another convolutional layer 408. The network continues to combiner 421 where the output of the convolutional layer 408 is combined with the output of convolutional layer 402, and is provided as input to convolutional layer 420, followed by shuffle layer 422, and additional convolutional layer 424. The neural network architecture of FIG. 4 is exemplary, and other embodiments may have more, fewer, and/or different components. For example, while two residual blocks are shown in FIG. 4, other embodiments may have more or fewer residual blocks.

In embodiments, the shuffle layer can be used to introduce some form of permutation or rearrangement into the data flow of a neural network, which can help improve the network's ability to learn complex patterns and relationships in the data for the purposes of denoising an image. In embodiments, the residual blocks can serve to address the problem of vanishing gradients in deep networks by introducing skip connections that allow the gradient to flow more directly through the network.

Figure 5:
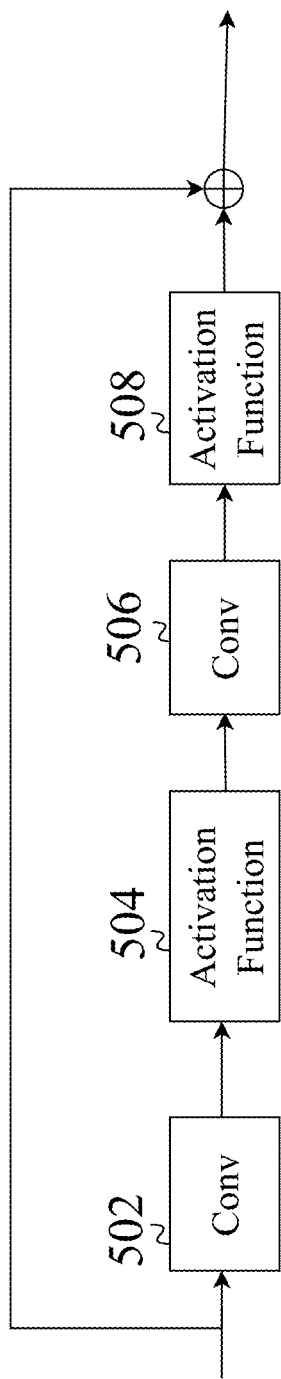
FIG. 5 is a diagram indicating additional details of the neural network architecture shown in FIG. 4, according to an embodiment.

FIG. 5 is a diagram indicating additional details of the neural network architecture shown in FIG. 4, according to an embodiment. In particular, FIG. 5 shows additional details of a residual block such as shown at 404 in FIG. 4. The residual block includes a convolutional block 502. The convolutional block can include one or more convolutional layers. In embodiments, each convolutional layer/block includes a set of learnable filters (also known as kernels) are applied to the input data. Each filter is convolved with the input data to produce a feature map, which highlights the presence of particular patterns or features in the input. The convolution operation involves sliding the filter over the input data, performing element-wise multiplication and summing the results to produce a single value in the output feature map. The output of convolutional block 502 is fed to activation function 504. In one or more embodiments, the activation function 504 includes a non-linear activation function. In one or more embodiments, the activation function 504 includes a ReLU (Rectified Linear Unit). In one or more embodiments, the activation function 504 includes a Leaky ReLU (Rectified Linear Unit). The Leaky ReLU (Rectified Linear Unit) is a type of activation function used in artificial neural networks. It is similar to the standard ReLU function but allows a small, non-zero gradient when the input is negative, instead of setting the gradient to zero. In one or more embodiments, the Leaky ReLU activation function is defined as follows:

$$f(x) = \begin{cases} x, & \text{if } x > 0 \\ \alpha x, & \text{otherwise} \end{cases}$$

Where $\alpha$ is a small constant, such as 0.01, that determines the slope of the function for negative inputs. This can serve to reduce the probability of developing inactive neurons during training and/or operational use of the neural network.

The output of the activation function 504 can be input to another convolutional block 506. The output of convolutional block 506 can be fed to an additional activation function 508. In one or more embodiments, the activation function 508 can include a sigmoid function. The sigmoid function can be used to introduce non-linearity into the network. In one or more embodiments, the sigmoid function is defined as:

$$f(x) = \frac{1}{1 + e^{-x}}$$

Where e is the base of the natural logarithm. The sigmoid function has a characteristic S-shaped curve that maps any real value to a value between 0 and 1. This property makes it suitable for binary classification problems, where the output can be interpreted as the probability of the input belonging to a certain class, including the identification of noise and artifacts in images, in accordance with disclosed embodiments. In one or more embodiments, the activation function 508 can include a ReLU function instead of, or in addition to, the sigmoid function. Other embodiments can include a Tanh (hyperbolic tangent) activation function, softmax activation function, swish activation function, and/or other suitable activation function.

Figure 6:
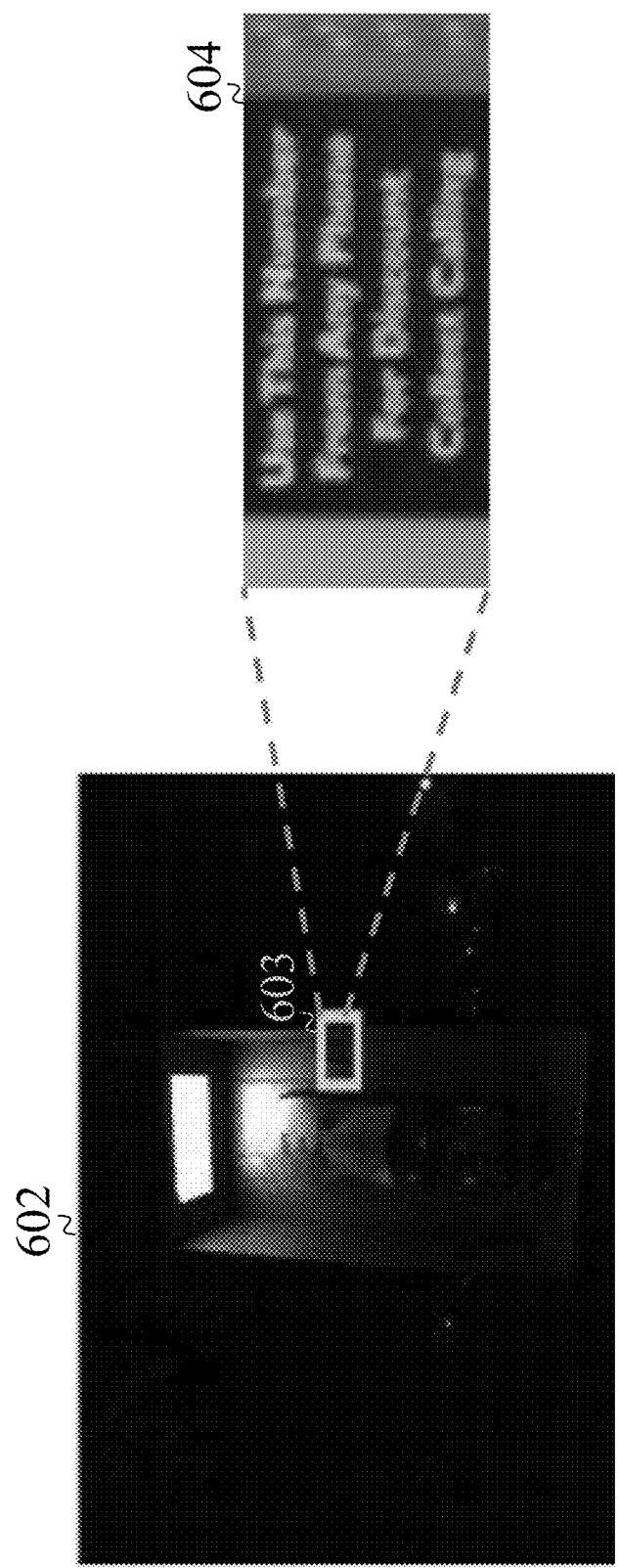
FIG. 6 shows an example of image enhancement performed by an embodiment.

FIG. 6 shows an example of image enhancement performed by an embodiment. Image 602 is a low-light image, containing minimal visible details. An area within the image 602, denoted by rectangle 603, is extracted as a raw input image, and processed using a system such as depicted in FIG. 2. The resulting enhanced low-light image is shown at 604. As can be seen, the enhanced low-light image reveals additional details not easily visible in the original image 602.

Detailed Description of Exemplary Aspects

Figure 7:
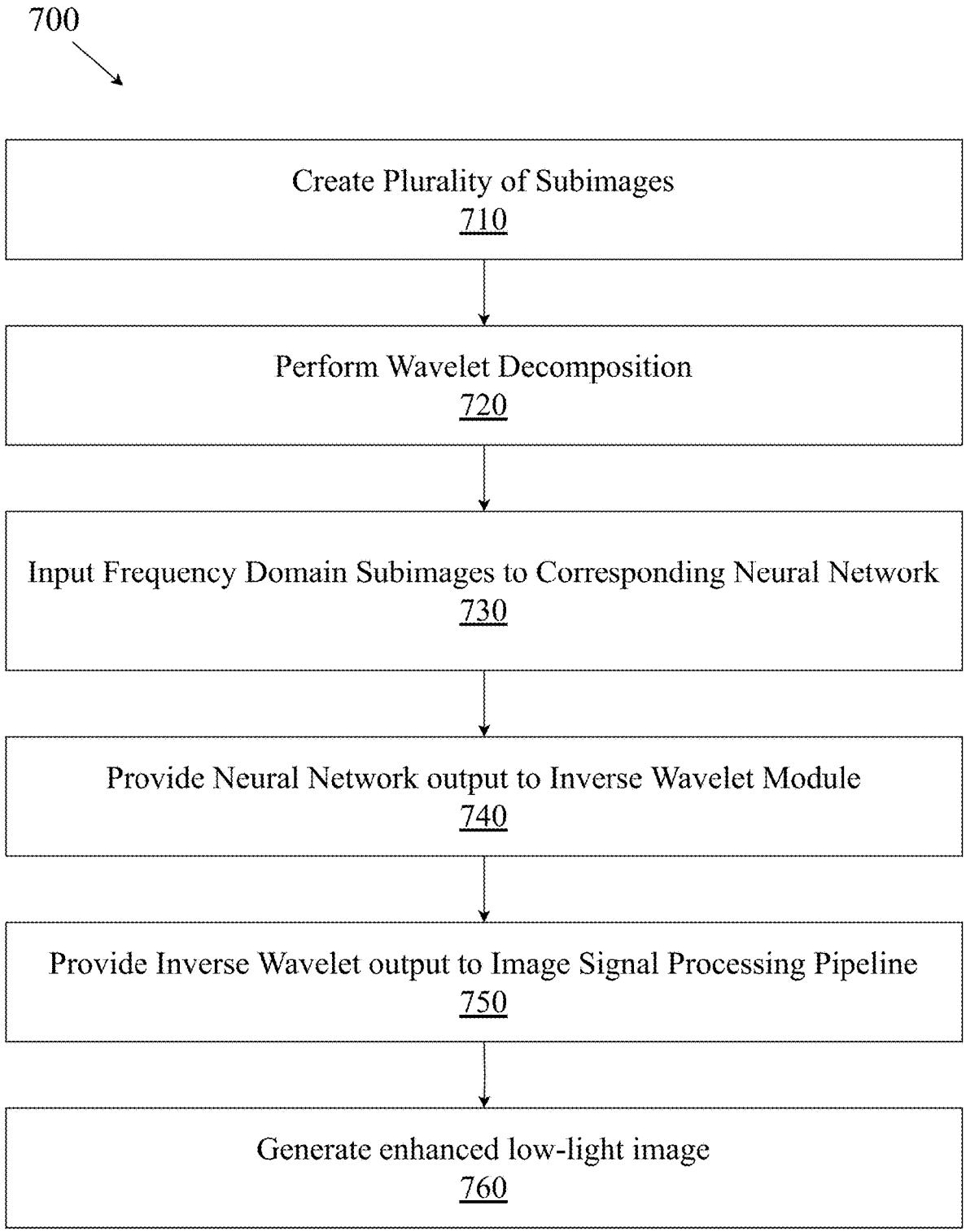
FIG. 7 is a flow diagram illustrating an exemplary method for image enhancement utilizing a denoising preprocessing module, according to an embodiment.

FIG. 7 is a flow diagram illustrating an exemplary method 700 for image enhancement utilizing a denoising preprocessing module, according to an embodiment. According to the embodiment, the process begins at step 710 where a plurality of subimages are created. The subimages can include images of a particular channel, such as red, green, blue, luminance, chrominance, and/or other suitable parameters. At step 720, wavelet decomposition is performed, to obtain frequency domain subimages. At step 730, the frequency domain subimages are input to a corresponding neural network, such as networks 216, 218, 220, and 222 of FIG. 2. At step 740, the output of the neural networks is provided to an inverse wavelet module, such as shown at 224 of FIG. 2. At step 750, the output of the image wavelet module is provided to an image signal processing (ISP) pipeline. At step 760, an enhanced low-light image is produced as an output of the ISP pipeline.

Exemplary Computing Environment

Figure 8:
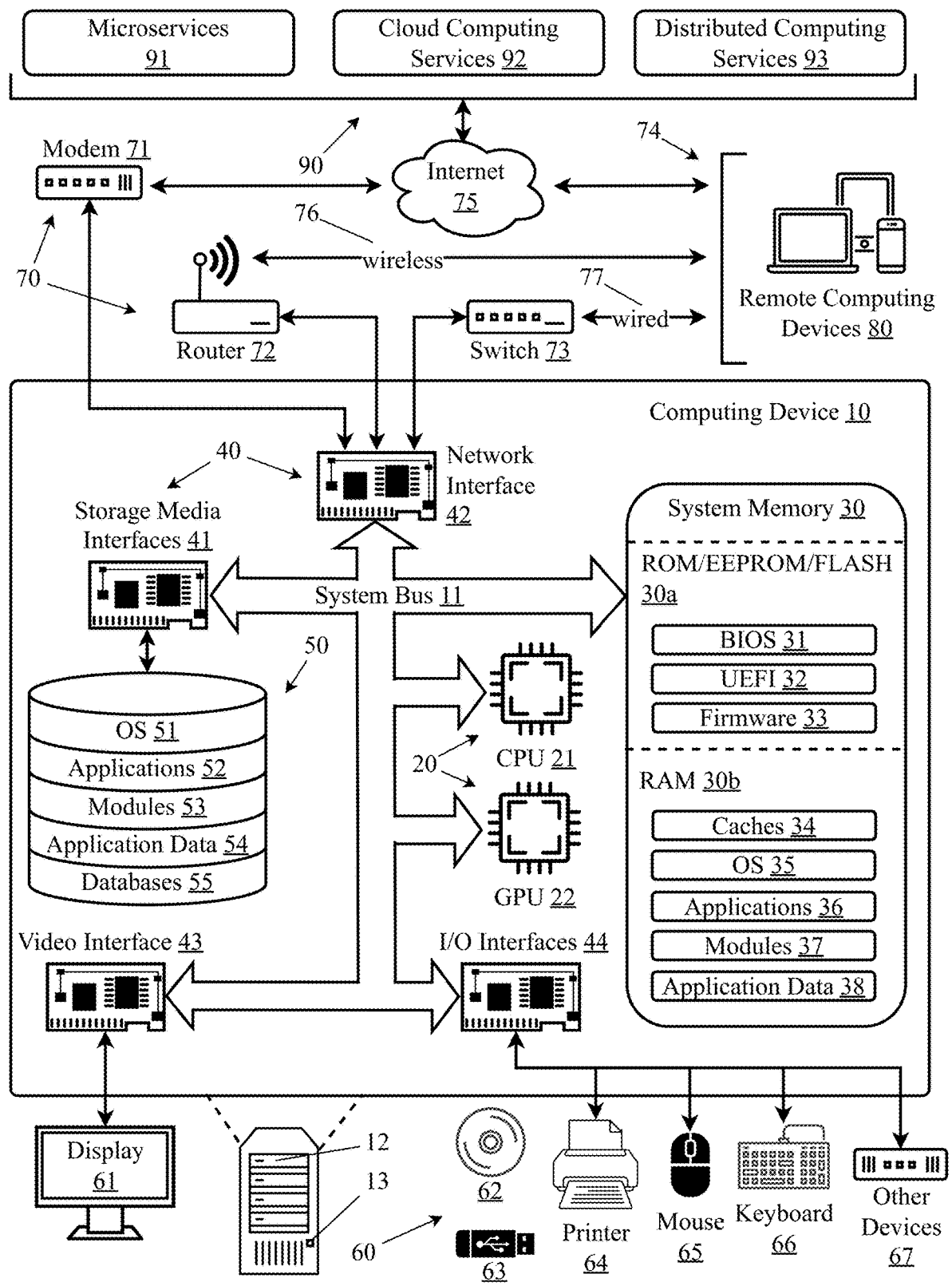
FIG. 8 illustrates an exemplary computing environment on which an embodiment described herein may be implemented, in full or in part.

FIG. 8 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid-state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containers or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

As can now be appreciated, disclosed embodiments enhance low-light images, allowing details that are difficult to see in the original image to become more visible. Enhancement of low-light images can be particularly useful for surveillance, security, and forensic applications, where identifying objects, people, or text in low-light conditions is important. In images containing text, such as documents or signs, enhancing the image can make the text more readable. This can be helpful in scenarios where capturing clear text is crucial, such as reading license plates or identifying street signs in low-light conditions. In photography and video recording, enhancing low-light images can improve the overall aesthetics of the image or video by making details and colors more vibrant and clearer. With the feature of enhancing low-light images, disclosed embodiments can have a wide range of applications across various industries, improving visibility, readability, and image quality in challenging lighting conditions.

The skilled person will be aware of a range of possible modifications of the various aspects described above. Accordingly, the present invention is defined by the claims and their equivalents.

What is claimed is:

1. A system for image enhancement, comprising:
    a computing device comprising at least a memory and a processor;
    a denoising preprocessing module comprising a first plurality of programming instructions that, when operating on the processor, cause the computing device to:
        create a plurality of subsampled subimages from a raw input image;
        perform a wavelet decomposition process on each subimage from the plurality of subimages to generate a plurality of frequency domain subimages;
        input each frequency domain subimage from the plurality of frequency domain subimages into a corresponding neural network;
        provide an output of each corresponding neural network to an inverse wavelet module; and
        provide an output of the inverse wavelet module to an image signal processing pipeline.

2. The system of claim 1, wherein the denoising preprocessing module further comprises programming instructions operable on the processor to create the plurality of subsampled subimages from a Bayer raw input image.

3. The system of claim 1, wherein the denoising preprocessing module further comprises programming instructions operable on the processor to utilize a Haar wavelet as a decomposition filter in the wavelet decomposition process.

4. The system of claim 1, wherein the denoising preprocessing module further comprises programming instructions operable on the processor to create four frequency domain subimages for the plurality of frequency domain subimages.

5. The system of claim 1, wherein the denoising preprocessing module further comprises programming instructions operable on the processor to perform downsampling as part of the wavelet decomposition process.

6. The system of claim 5, wherein the denoising preprocessing module further comprises programming instructions operable on the processor to perform processing rows of image data, followed by processing columns of image data.

7. The system of claim 1, further comprising a neural network module comprising a second plurality of programming instructions operable on the processor to implement the plurality of neural networks, wherein each neural network includes a Leaky ReLU activation function.

8. The system of claim 7, wherein the neural network module further comprises programming instructions operable on the processor to implement a plurality of neural network blocks, wherein the plurality of neural network blocks includes at least one convolutional block, and least one residual block, and at least one Squeeze-and-Excitation block.

9. A method for image enhancement, comprising steps of:
creating a plurality of subsampled subimages from a raw input image;
performing a wavelet decomposition process on each subimage from the plurality of subimages to generate a plurality of frequency domain subimages;
inputting each frequency domain subimage from the plurality of frequency domain subimages into a corresponding neural network;
providing an output of each corresponding neural network to an inverse wavelet module; and
providing an output of the inverse wavelet module to an image signal processing pipeline.

10. The method of claim 9, wherein creating the plurality of subsampled subimages from the raw input image comprises inputting a raw image in a Bayer raw image format.

11. The method of claim 9, further comprising using a Haar wavelet as a decomposition filter in the wavelet decomposition process.

12. The method of claim 9, further comprising creating four frequency domain subimages for the plurality of frequency domain subimages.

13. The method of claim 9, wherein the wavelet decomposition process further comprises downsampling.

14. The method of claim 13, further comprising processing rows of image data, followed by processing columns of image data.

15. A computer program product for an electronic computation device comprising a non-transitory computer readable storage medium having program instructions embodied therewith, the program instructions executable by a processor to cause the electronic computation device to:
create a plurality of subsampled subimages from a raw input image;
perform a wavelet decomposition process on each subimage from the plurality of subimages to generate a plurality of frequency domain subimages;
input each frequency domain subimage from the plurality of frequency domain subimages into a corresponding neural network;
provide an output of each corresponding neural network to an inverse wavelet module; and
provide an output of the inverse wavelet module to an image signal processing pipeline.

16. The computer program product of claim 15, wherein the computer readable storage medium further comprises program instructions that, when executed by the processor, cause the electronic computation device to perform downsampling as part of the wavelet decomposition process.

17. The computer program product of claim 15, wherein the computer readable storage medium further comprises program instructions that, when executed by the processor, cause the electronic computation device to utilize a Haar wavelet as a decomposition filter in the wavelet decomposition process.

18. The computer program product of claim 15, wherein the computer readable storage medium further comprises program instructions that, when executed by the processor, cause the electronic computation device to create the plurality of subsampled subimages from a Bayer raw input image.

19. The computer program product of claim 15, wherein the computer readable storage medium further comprises program instructions that, when executed by the processor, cause the electronic computation device to implement the plurality of neural networks, wherein each neural network includes a Leaky ReLU activation function.

20. The computer program product of claim 19, wherein the computer readable storage medium further comprises program instructions that, when executed by the processor, cause the electronic computation device to implement a plurality of neural network blocks, wherein the plurality of neural network blocks includes at least one convolutional block, and least one residual block, and at least one Squeeze-and-Excitation block.

* * * * *